US012524672B2

United States Patent
Ackerman et al.

(10) Patent No.: US 12,524,672 B2
(45) Date of Patent: Jan. 13, 2026

(54) SYSTEM, METHOD, AND APPARATUS FOR IDENTIFYING CONGENITAL LONG QT SYNDROME IN A SUBJECT

(71) Applicant: Mayo Foundation for Medical Education and Research, Rochester, MN (US)

(72) Inventors: Michael J. Ackerman, Rochester, MN (US); Itzhak Zachi Attia, Rochester, MN (US); Johan Martijn Bos, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 18/595,645

(22) Filed: Mar. 5, 2024

(65) Prior Publication Data
US 2025/0284950 A1 Sep. 11, 2025

(51) Int. Cl.
*G06N 3/08* (2023.01)
*G06N 3/0464* (2023.01)
*A61B 5/36* (2021.01)

(52) U.S. Cl.
CPC ............ *G06N 3/08* (2013.01); *G06N 3/0464* (2023.01); *A61B 5/36* (2021.01)

(58) Field of Classification Search
CPC .......... G06N 3/08; G06N 3/0464; A61B 5/36
See application file for complete search history.

(56) References Cited

U.S. PATENT DOCUMENTS

| 7,593,764 | B2* | 9/2009 | Kohls ..................... A61B 5/36 600/509 |
| 11,337,637 | B2 | 5/2022 | Noseworthy et al. |
| 2008/0188761 | A1 | 8/2008 | Couderc |
| 2017/0112401 | A1* | 4/2017 | Rapin .................... A61B 5/316 |

(Continued)

FOREIGN PATENT DOCUMENTS

WO 2007106781 A2 9/2007

OTHER PUBLICATIONS

Noseworthy et al. (hereinafter Nose) in view of Geeks For Geeks, Training vs Testing vs Validation Sets, last updated Nov. 22, 2021, https://www.geeksforgeeks.org/training-vs-testing-vs-validation-sets/, viewed on Jun. 5, 2025 (Year: 2021).*

(Continued)

*Primary Examiner* — James M Kish
*Assistant Examiner* — James Moss
(74) *Attorney, Agent, or Firm* — Caldwell Intellectual Property Law

(57) ABSTRACT

Described herein are systems, methods, and apparatuses for identifying LQTS in a subject. A system may include an electrocardiogram (ECG) sensor configured to detect an ECG datum. A system may include a computing device configured to receive an electrocardiogram (ECG) datum; train an LQTS determination machine learning model on a training dataset including a plurality of example ECG data as inputs correlated to a plurality of example LQTS data as outputs; and generate an LQTS determination datum as a function of the ECG datum using the trained LQTS determination machine learning model. A system may include a display configured to display an LQTS determination datum.

20 Claims, 15 Drawing Sheets

(56) References Cited

U.S. PATENT DOCUMENTS

| | | | |
|---|---|---|---|
| 2020/0196898 A1* | 6/2020 | Hajimolahoseini | A61B 5/36 |
| 2021/0121117 A1* | 4/2021 | Albert | A61B 5/7267 |
| 2021/0275080 A1* | 9/2021 | Noseworthy | G16H 50/30 |
| 2022/0198657 A1* | 6/2022 | Hall | G06V 10/50 |
| 2022/0296116 A1* | 9/2022 | Gideon | G16H 50/50 |
| 2022/0384045 A1* | 12/2022 | Zimmerman | A61B 5/0006 |
| 2023/0076431 A1* | 3/2023 | Nyayate | G06N 3/063 |
| 2023/0245782 A1 | 8/2023 | Zimmerman et al. | |
| 2023/0326601 A1 | 10/2023 | Xue et al. | |

OTHER PUBLICATIONS

Pantelis Monogioudis, Syllabus and CNN Architectures—Convolutional Layer, https://pantelis.github.io/cs301/docs/syllabus/ and https://pantelis.github.io/cs301/docs/common/lectures/cnn/cnn-layers/, Sep. 1, 2021, viewed on Jun. 6, 2025 (Year: 2021).*

European Search Report; EP 25161673; Date: Jul. 16, 2025.

* cited by examiner

|  | All | LQTS (Case) N = 808 | Acquired (Control) N = 3,529 |
|---|---|---|---|
| Training data set # | 3,039 | 577 | 2,462 |
| Men, No. (%) | 1,122 (36.92%) | 214 (37.09%) | 908 (36.88%) |
| Age, mean (SD), yrs | 23.47 (17.93) | 22.12 (17.64) | 23.79 (17.99) |
| BMI (kg/m²) | 25.05 (7.99) | 24.20 (6.78) | 25.25 (8.25) |
| Validation data set # | 411 | 67 | 344 |
| Men, No. (%) | 162 (39.42%) | 27 (40.30%) | 135 (39.24%) |
| Age, mean (SD), yrs | 23.03 (18.27) | 23.19 (18.56) | 23.00 (18.24) |
| BMI (kg/m²) | 23.64 (7.38) | 18.13 (5.27) | 24.63 (7.32) |
| Test data set # | 887 | 164 | 723 |
| Men, No. (%) | 339 (38.22%) | 65 (39.63%) | 274 (37.90%) |
| Age, mean (SD), yrs | 24.06 (17.83) | 21.44 (17.07) | 24.66 (17.96) |
| BMI (kg/m²) | 24.98 (7.43) | 24.16 (7.96) | 25.19 (7.33) |

FIG. 3

| | Cohort | Ratio | Case # | Control # | Training # | Validation # | Test # | Op_th | Accuracy (%) | Test AUC | Sensitivity (Recall) (%) | Specificity (%) | PPV (Precision) (%) | NPV (%) | False positive rate (%) | False negative rate (%) |
|---|---|---|---|---|---|---|---|---|---|---|---|---|---|---|---|---|
| Rhythm ECG | No filter | 1:5 | 808 | 3,529 | 3,039 | 411 | 887 | 0.14046645 | 85.34 | 0.896 | 76.83 | 87.28 | 57.89 | 94.32 | 12.72 | 23.17 |
| | | 1:10 | 808 | 5,821 | 4,585 | 720 | 1,324 | 0.04204217 | 85.80 | 0.898 | 79.19 | 86.79 | 47.41 | 96.52 | 13.21 | 20.81 |
| | | 1:200 | 808 | 49,282 | 34,966 | 5,112 | 10,012 | 0.38115922 | 87.63 | 0.921 | 77.84 | 87.80 | 9.77 | 99.57 | 12.20 | 22.16 |
| | | 1:2,000 | 808 | 420,957 | 85,454 | 12,059 | 24,232 | 0.95867133 | 89.44 | 0.933 | 80.75 | 89.50 | 4.89 | 99.86 | 10.50 | 19.25 |
| | Excl. PM or wide QRS | 1:5 | 766 | 3,117 | 2,718 | 361 | 1,167 | 0.18508646 | 85.32 | 0.89 | 77.56 | 87.19 | 59.31 | 94.17 | 12.81 | 22.44 |
| | | 1:10 | 766 | 5,170 | 4,118 | 631 | 1,187 | 0.11746374 | 86.60 | 0.883 | 71.60 | 89.10 | 52.16 | 94.97 | 10.90 | 28.40 |
| | | 1:200 | 766 | 44,408 | 31,530 | 4,596 | 9,048 | 0.83687145 | 87.87 | 0.931 | 77.78 | 87.24 | 10.00 | 99.54 | 12.76 | 22.22 |
| | | 1:2,000 | 766 | 105,625 | 74,723 | 10,524 | 21,146 | 0.9370514 | 87.07 | 0.948 | 90.41 | 87.05 | 4.65 | 99.95 | 12.95 | 9.59 |
| Median beat ECG | No filter | 1:5 | 808 | 3,529 | 3,039 | 411 | 887 | 0.02724494 | 87.94 | 0.9 | 74.39 | 91.01 | 65.24 | 94.00 | 8.99 | 25.61 |
| | | 1:10 | 808 | 5,821 | 4,585 | 720 | 1,324 | 0.08775276 | 81.80 | 0.912 | 83.82 | 81.49 | 40.50 | 97.10 | 18.51 | 16.18 |
| | | 1:200 | 808 | 49,282 | 34,966 | 5,112 | 10,012 | 0.36309968 | 85.55 | 0.931 | 83.23 | 85.59 | 8.92 | 99.67 | 14.41 | 16.77 |
| | | 1:2,000 | 808 | 420,957 | 85,533 | 12,075 | 24,137 | 0.98100365 | 86.54 | 0.952 | 91.41 | 86.51 | 4.40 | 99.95 | 13.49 | 8.59 |
| | Excl. PM or wide QRS | 1:5 | 766 | 3,117 | 2,718 | 361 | 1,167 | 0.03915635 | 86.82 | 0.912 | 78.85 | 88.73 | 62.76 | 94.57 | 11.27 | 21.15 |
| | | 1:10 | 766 | 5,170 | 4,118 | 631 | 1,187 | 0.34493086 | 87.70 | 0.908 | 75.74 | 89.69 | 54.94 | 95.70 | 10.31 | 24.26 |
| | | 1:200 | 766 | 44,408 | 31,530 | 4,596 | 9,048 | 0.3236679 | 87.18 | 0.931 | 83.95 | 87.24 | 10.71 | 99.67 | 12.76 | 16.05 |
| | | 1:2,000 | 766 | 105,625 | 74,653 | 10,579 | 21,154 | 0.95911634 | 89.07 | 0.951 | 87.42 | 90.09 | 6.26 | 99.89 | 9.91 | 12.58 |

FIG. 5

| Cohort description | | Ratio | Accuracy (%) | AUC | Sensitivity (Recall) (%) | Specificity (%) | PPV (Precision) (%) | NPV (%) | False positive rate (%) | False negative rate (%) |
|---|---|---|---|---|---|---|---|---|---|---|
| Rhythm ECG | No filter | 1:5 | 85.81 | 0.915 | 81.00 | 87.28 | 66.05 | 93.76 | 12.72 | 19.00 |
| | | 1:10 | 86.08 | 0.906 | 82.35 | 86.79 | 54.49 | 96.24 | 13.21 | 17.65 |
| | | 1:200 | 87.67 | 0.916 | 81.90 | 87.80 | 13.10 | 99.54 | 12.20 | 18.10 |
| | | 1:2,000 | 89.46 | 0.943 | 87.33 | 89.50 | 7.09 | 99.87 | 10.50 | 12.67 |
| | Excl. PM or wide QRS | 1:5 | 83.67 | 0.926 | 90.15 | 81.64 | 80.60 | 96.36 | 18.36 | 9.85 |
| | | 1:10 | 87.39 | 0.917 | 78.82 | 89.10 | 59.04 | 95.47 | 10.90 | 21.18 |
| | | 1:200 | 87.20 | 0.930 | 85.71 | 87.24 | 13.30 | 99.63 | 12.76 | 14.29 |
| | | 1:2,000 | 87.08 | 0.946 | 90.15 | 87.05 | 6.31 | 99.88 | 12.95 | 9.85 |
| Median beat ECG | No filter | 1:5 | 74.68 | 0.923 | 92.76 | 69.16 | 47.90 | 96.90 | 30.84 | 7.24 |
| | | 1:10 | 82.58 | 0.926 | 88.24 | 81.49 | 47.79 | 97.30 | 18.51 | 11.76 |
| | | 1:200 | 85.63 | 0.938 | 87.78 | 85.59 | 12.03 | 99.68 | 14.41 | 12.22 |
| | | 1:2,000 | 86.51 | 0.930 | 86.88 | 86.51 | 5.60 | 99.86 | 13.49 | 13.12 |
| | Excl. PM or wide QRS | 1:5 | 82.84 | 0.932 | 90.15 | 80.56 | 59.22 | 96.31 | 19.44 | 9.85 |
| | | 1:10 | 88.78 | 0.945 | 87.19 | 89.10 | 61.46 | 97.21 | 10.90 | 12.81 |
| | | 1:200 | 87.26 | 0.942 | 88.18 | 87.24 | 13.63 | 99.69 | 12.76 | 11.82 |
| | | 1:2,000 | 90.06 | 0.952 | 86.70 | 90.09 | 7.80 | 99.86 | 9.91 | 13.30 |

FIG. 6

|  | All N = 121,745 | LQTS (Case) N = 808 | Acquired (Control) N = 120,937 |
|---|---|---|---|
| Training data set # | 85,533 | 559 | 84,974 |
| Men, No. (%) | 37,756 (44.14) | 214 (38.28) | 37,542 (44.18) |
| Age, mean (SD), yrs | 51.52 (15.73) | 22.33 (17.70) | 51.71 (15.54) |
| BMI (kg/m²) | 28.03 (6.672) | 24.77 (7.37) | 28.04 (6.62) |
| Validation data set # | 12,075 | 86 | 11,989 |
| Men, No. (%) | 5,306 (43.94) | 27 (31.40) | 5,279 (44.03) |
| Age, mean (SD), yrs | 51.53 (15.88) | 21.79 (18.09) | 51.74 (15.66) |
| BMI (kg/m²) | 28.11 (6.79) | 19.52 (5.16) | 28.14 (6.78) |
| Test data set # | 24,137 | 163 | 23,974 |
| Men, No. (%) | 10,729 (44.45) | 65 (39.88) | 10,664 (44.48) |
| Age, mean (SD), yrs | 51.49 (15.89) | 20.36 (16.92) | 51.70 (15.67) |
| BMI (kg/m²) | 28.05 (6.77) | 22.06 (5.82) | 28.07 (6.77) |

FIG. 7

SYSTEM, METHOD, AND APPARATUS FOR IDENTIFYING CONGENITAL LONG QT SYNDROME IN A SUBJECT

FIELD OF THE INVENTION

The present invention generally relates to the field of machine learning. In particular, the present invention is directed to system, method, and apparatus for identifying congenital long QT syndrome in a subject.

BACKGROUND

ECG-ascertained QT-prolongation—especially when the heart rate-corrected QT interval (QTc) exceeds 500 ms—is associated with an increased risk of cardiac arrhythmias which can result in syncope, seizures, sudden cardiac arrest (SCA) or, tragically, sudden cardiac death (SCD). While QT prolongation is the pathognomonic feature of congenital long QT syndrome (LQTS), a prolonged QTc can also be observed in patients with electrolyte abnormalities (mainly hypokalemia and hypomagnesemia), certain cardiac and non-cardiac medical conditions with disease-associated QT prolongation, or in the setting of medications that can prolong the QT interval. In fact, over 100 FDA approved drugs have reported QT prolongation, and even drug-induced, prolonged QT-mediated SCD, of which for many this is the only or best treatment option for certain patients. More importantly, while LQTS is rare with an estimated prevalence of 1 in 2,000 individuals, acquired QT prolongation is fairly common—seen in about 10% of patients receiving an ECG in a tertiary institution and more importantly, potentially reversible by addressing its underlying causes.

SUMMARY OF THE DISCLOSURE

In an aspect, an apparatus for generating an LQTS determination datum may include at least a processor; and a memory communicatively connected to the at least processor, wherein the memory contains instructions configuring the at least processor to receive an electrocardiogram (ECG) datum; train an LQTS determination machine learning model on a training dataset including a plurality of example ECG data as inputs correlated to a plurality of example LQTS data as outputs; and generate the LQTS determination datum as a function of the ECG datum using the trained LQTS determination machine learning model; wherein the LQTS determination machine learning model comprises a neural network with a plurality of 2D convolution stacked blocks and a final output layer activated using at least an activation function.

In another aspect, a method of generating an LQTS determination datum may include, using at least a processor, receiving an electrocardiogram (ECG) datum; using the at least a processor, training an LQTS determination machine learning model on a training dataset including a plurality of example ECG data as inputs correlated to a plurality of example LQTS data as outputs; and using the at least a processor, generating the LQTS determination datum as a function of the ECG datum using the trained LQTS determination machine learning model; wherein the LQTS determination machine learning model comprises a neural network with a plurality of 2D convolution stacked blocks and a final output layer activated using at least an activation function.

In another aspect, a system for generating an LQTS determination datum may include an electrocardiogram (ECG) sensor configured to detect an ECG datum; and transmit the ECG datum to a computing device; a computing device communicatively connected to the ECG sensor configured to receive an electrocardiogram (ECG) datum from the ECG sensor; generate the LQTS determination datum as a function of the ECG datum using a trained LQTS determination machine learning model; and transmit to a display the LQTS determination datum; wherein the LQTS determination machine learning model comprises a neural network with a plurality of 2D convolution stacked blocks and a final output layer activated using at least an activation function; and a display configured to receive an LQTS determination datum from the computing device; and display the LQTS determination datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a table describing baseline characteristics of the case (LQTS) and control (acquired QT prolongation) population (1:5 match ratio);

FIG. 5 is a table describing main and sub-group analyses examining the performance of the AI-ECG-LQTS detect algorithm;

FIG. 6 is a table describing validation of the AI-ECG-LQTS detect models on all ECGs of the cases.

FIG. 7 is a table describing baseline characteristics of patients with LQTS and control populations (matching ratio=2000);

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems, methods, and apparatuses for identifying congenital long QT syndrome (LQTS) in a subject. In some embodiments, one or more electrocardiogram (ECG) sensors may be used to detect ECG data on a subject, and this ECG data may be input into a trained neural network in order to determine whether a subject has LQTS and/or acquired QT prolongation. In some embodiments, a neural network may be trained using ECG data on a plurality of prior subjects, as well as a determination as to whether such prior subjects had LQTS by another means, such as genetic testing.

Figure 1:
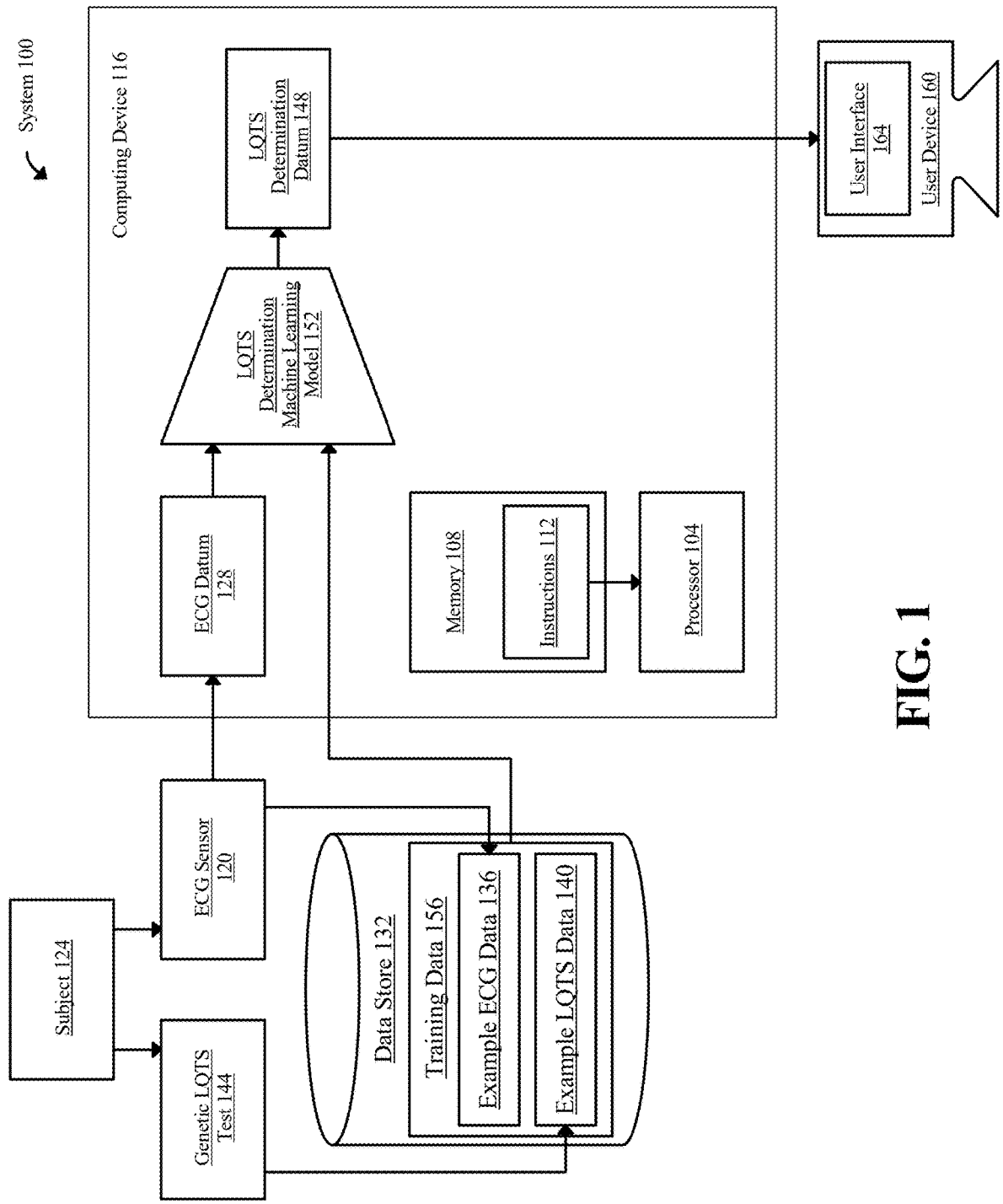
FIG. 1 is a diagram depicting an exemplary system for identifying LQTS in a subject.

Referring now to FIG. 1, an exemplary embodiment of a system 100 for identifying LQTS in a subject is illustrated. System 100 may include a computing device. System 100 may include a processor. Processor may include, without limitation, any processor described in this disclosure. Processor may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. A computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, system 100 may include at least a processor 104 and a memory 108 communicatively connected to the at least a processor 104, the memory 108 containing instructions 112 configuring the at least a processor 104 to perform one or more processes described herein. Computing device 116 may include processor 104 and/or memory 108. Computing device 116 may be configured to perform one or more processes described herein.

Still referring to FIG. 1, computing device 116 may include but is not limited to, for example, a computing device or cluster of computing devices in a first location and a second computing device or cluster of computing devices in a second location. Computing device 116 may include one or more computing devices dedicated to data storage, security, distribution of traffic for load balancing, and the like. Computing device 116 may distribute one or more computing tasks as described below across a plurality of computing devices of computing device, which may operate in parallel, in series, redundantly, or in any other manner used for distribution of tasks or memory between computing devices. Computing device 116 may be implemented, as a non-limiting example, using a "shared nothing" architecture.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, system 100 may include an electrocardiogram (ECG) sensor 120. ECG sensor 120 may include one or more electrodes. Electrodes may be placed on subject 124 such as on chest, arms, and legs of subject 124. ECG sensor 120 may include one or more lead wires. ECG sensor 120 may include a device configured to measure and/or interpret electrical activity of heart of subject 124 using electrodes and/or lead wires. In some embodiments, ECG sensor 120 may be configured to detect ECG datum 128 and/or transmit ECG datum 128 to computing device 116. As used herein, an "ECG datum" is a datum describing electrical activity of the heart of a subject. In some embodiments, an ECG datum may include a rhythm strip ECG datum. As used herein, a "rhythm strip ECG datum" is a datum describing electrical activity detected using a single electrode. In some embodiments, an ECG datum may include a median beat ECG datum. As used herein, a "median beat ECG datum" is a datum describing electrical activity detected using a plurality of leads and/or electrodes. In some embodiments, ECG datum 128 may include data collected by 2, 3, 4, 5, 6, 7, 8, 9, 10, 11, 12, or more ECG leads. For example, ECG datum 128 may include a median beat collected by 12 ECG leads. In some embodiments, an ECG datum may be associated with a particular subject 124. In some embodiments, a subject 124 may have a ventricular pacemaker.

Still referring to FIG. 1, in some embodiments, ECG datum 128 may be stored in a data store 132 and/or memory 108. Data store 132 may be implemented, without limitation, as a relational database, a key-value retrieval database such as a NOSQL database, or any other format or structure for use as a database that a person skilled in the art would recognize as suitable upon review of the entirety of this disclosure. Data store 132 may alternatively or additionally be implemented using a distributed data storage protocol and/or data structure, such as a distributed hash table or the like. Data store 132 may include a plurality of data entries and/or records as described above. Data entries in a data store 132 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. ECG data stored in data store 132 may be used as example ECG data 136 for training a machine learning model as described below. In some embodiments, data store 132 may include an electronic health record database. In some embodiments, an electronic health record database may include health information such as ECG data and genetic LQTS test data from a plurality of subjects. In some embodiments, health information may be received in an anonymized state and/or may be anonymized by system 100, such as by removing identifying information.

Still referring to FIG. 1, in some embodiments, computing device 116 may receive ECG datum 128. In some embodiments, computing device 116 may receive ECG datum 128 from ECG sensor 120. In some embodiments, computing device 116 may receive ECG datum 128 from data store 132. For example, computing device 116 may receive ECG datum 128 from data store 132 in a situation in which a subject previously received an ECG and now wishes to know whether or not the subject has LQTS.

Still referring to FIG. 1, in some embodiments, data store 132 and/or computing device 116 may receive example LQTS data 140. In some embodiments, subject 124 may receive genetic LQTS test 144. In some embodiments, system 100 may include a genetic LQTS test sensor. A genetic LQTS test may include, for example, a test to determine whether a subject has a gene associated with LQTS. In some embodiments, example LQTS data may be used to train a machine learning model as described herein.

Still referring to FIG. 1, in some embodiments, system 100 may determine LQTS determination datum 148. As used herein, an "LQTS determination datum" is a datum describing whether a subject has LQTS. In non-limiting examples, LQTS determination datum 148 may include a categorical answer as to whether a subject has LQTS, or a probability that a subject has LQTS. In some embodiments, LQTS determination machine learning model 152 may be used to determine LQTS determination datum 148. LQTS determination machine learning model 152 may be trained using a supervised learning algorithm. LQTS determination machine learning model 152 may include a classifier. LQTS determination machine learning model 152 may include a neural network. LQTS determination machine learning model 152 may include a convolutional neural network. LQTS determination machine learning model 152 may be trained on training data 156 including example ECG data, associated with example LQTS determination data. Such training dataset may be obtained by, for example, receiving training data 156 from data store 132. Example ECG data 136 may include ECG data obtained from electrocardiograms performed on prior subjects. In some embodiments, example ECG data 136 may be supplemented with ECG datum 128 associated with subject 124. In some embodiments, such data may be used to modify and/or retrain LQTS determination machine learning model 152. Example LQTS data 140 may be obtained from prior genetic LQTS tests and may be supplemented with data from a genetic LQTS test applied to subject 124, such as for model retraining purposes. Once LQTS determination machine learning model 152 is trained, it may be used to determine LQTS determination datum 148. System 100 may input ECG datum 128 into LQTS determination machine learning model 152, and system 100 may receive LQTS determination datum 148 from the model.

Still referring to FIG. 1, in some embodiments, LQTS determination machine learning model 152 may be trained using a reinforcement learning algorithm. For example, LQTS determination machine learning model 152 may be given inputs such as ECG datum 128, and LQTS determination machine learning model 152 may be adjusted based on a cost function, where the cost function is based on the model's output. Such a cost function may take into account, for example, whether a resulting LQTS determination datum agrees with a result of a genetic LQTS test.

Still referring to FIG. 1, in some embodiments, LQTS determination machine learning model 152 may be trained using training data 156 including data on subjects who have had at least one ECG above age- and sex-specific 99th percentile values for QTc. In some embodiments, training data 156 may include data on subjects with QTc>460 ms for all patients (as in, not restricted to one of male and female) who are <13 years of age. In some embodiments, training data 156 may include data on subjects with QTc>470 ms for men >13 years of age. In some embodiments, training data 156 may include data on subjects with QTc>480 ms for women >13 years of age. In some embodiments, training data 156, such as example LQTS data 140, may include a 1:5 ratio of LQTS outputs to non-LQTS outputs. In some embodiments, training data 156, such as example LQTS data 140, may include a 1:10 ratio of LQTS outputs to non-LQTS outputs. In some embodiments, training data 156, such as example LQTS data 140, may include a 1:200 ratio of LQTS outputs to non-LQTS outputs. In some embodiments, training data 156, such as example LQTS data 140, may include a 1:2000 ratio of LQTS outputs to non-LQTS outputs. In some embodiments, training data 156, such as example LQTS data 140, may include a 1:X ratio of LQTS outputs to non-LQTS outputs, where X is in the range 5 to 2000. In some embodiments, a control cohort may include subjects with acquired QT prolongation with QTc>460 for male or female patients <13 years of age, QTc>470 ms for men >13 years of age, and QTc>480 ms for women >13 years of age. In some embodiments, ECG data may include rhythm strip ECG data. In some embodiments, example ECG data 136 and/or ECG datum 128 may include data in the form of a data structure with dimensions including a number of leads of an ECG and a number of sequentially captured readings. In a non-limiting example, data captured from a 12-lead ECG monitored at 500 Hz for 10 seconds may include 5000 data points per lead and may produce an input ECG shape of 5000×12×1. In some embodiments, ECG data with different frequency, duration, and/or number of leads may be used. In some embodiments, ECGs may be distributed into training, validation, and test data sets. Such distribution may be random. In some embodiments, a training dataset may include 70% of an overall dataset, a validation dataset may include 10% of an overall dataset, and a test dataset may include 20% of an overall dataset. In some embodiments, training data ECGs may be zero-padded, such as from 5000×12×1 to 5120×12×1. In some embodiments, LQTS determination machine learning model 152 may include a plurality of stacked blocks of convolutional layers. For example, LQTS determination machine learning model 152 may include a plurality of stacked blocks of 2D convolutional layers. For example, LQTS determination machine learning model 152 may include 8 stacked blocks of 2D convolutional layers. In some embodiments, LQTS determination machine learning model 152 may include one or more of max pooling, batch normalization, dropout, and fully connected layers. For example, LQTS determination machine learning model 152 may include 2 fully connected layers. LQTS determination machine learning model 152 may include a final output layer. Such final output layer may be activated using a function which assigns probabilities to each class of a plurality of classes. For example, such plurality of classes may include a first class associated with a subject having LQTS and a second class associated with a subject not having LQTS. In some embodiments, such final output layer may be activated using a Softmax function. In some embodiments, median beat ECG data may be used to train LQTS determination machine learning model 152. For example, median beat ECG data may have an input ECG shape of 600×12×1.

Still referring to FIG. 1, in some embodiments, more than one LQTS determination machine learning model 152 is produced. LQTS determination machine learning model 152 performance may be evaluated using the area under the curve (AUC) of the receiver operating characteristic (ROC) curve, positive predict value (PPV), negative predict value (NPV), sensitivity, specificity, accuracy, false positive rate (FPR) and/or false negative rate (FNR). In some embodiments, an LQTS determination machine learning model 152 may be selected from a plurality of models based on one or more such metrics. In some embodiments, LQTS determination machine learning model 152 may be evaluated using a matching ratio other than 1:5, such as 1:10. In some embodiments, LQTS determination machine learning model 152 may be evaluated using data on subjects with a pacemaker.

Still referring to FIG. 1, in some embodiments, system 100 may identify LQTS in a subject. In some embodiments, identification of LQTS in a subject may be done as a function of LQTS determination datum 148. In some embodiments, a therapy may be administered to a subject as a function of LQTS determination datum 148. For example, a therapy approved to treat LQTS may be administered to a subject with LQTS determination datum 148 indicating that the subject is likely to have LQTS. In some embodiments, an appointment with a medical professional may be made based on LQTS determination datum 148. For example, an appointment with a medical professional may be made for subjects with LQTS determination datum 148 indicating that they are likely to have LQTS. Such an appointment may be used to, for example, discuss treatment options.

Still referring to FIG. 1, in some embodiments, system 100 may display LQTS determination datum 148 to a user, such as subject 124 and/or a medical professional. User device 160 and/or user interface 164 may be used to display LQTS determination datum 148. In some embodiments, system 100 may transmit a signal including LQTS determination datum 148 to user device 160, and the signal may configure user device 160 to communicate LQTS determination datum 148 to user. User device 160 may communicate LQTS determination datum 148 to a user using, for example, a visual or audio format. System 100 may communicate a visual element and/or visual element data structure including LQTS determination datum 148 to user device 160. This may configure user device 160 to display a visual element, such as by using user interface 164 to do so. As used herein, a device "displays" a datum if the device outputs the datum in a format suitable for communication to a user. For example, a device may display a datum by outputting text or an image on a screen or outputting a sound using a speaker.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of LQTS determination datum 148. In some embodiments, a visual element data structure may be determined as a function of an item from the list consisting of an identifier of subject 124, ECG datum 128, and LQTS determination datum 148. In a non-limiting example, a visual element data structure may be generated such that a visual element describing or highlighting LQTS determination datum 148 is displayed to a user such as subject 124.

Still referring to FIG. 1, in some embodiments, visual element may include one or more elements of text, images, shapes, charts, particle effects, interactable features, and the like. For example, a visual element may include a depiction of ECG datum 128 alongside LQTS determination datum 148.

Still referring to FIG. 1, a visual element data structure may include rules governing if or when visual element is displayed. In a non-limiting example, a visual element data structure may include a rule causing a visual element describing LQTS determination datum 148 to be displayed when a user selects LQTS determination datum 148 using a graphical user interface (GUI).

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, multiple ECGs of a subject may be analyzed, and similar visual elements may be produced if LQTS determination datum 148 based on such multiple ECGs indicates the same outcome. A visual element data structure may rank data or assign numerical values to them. For example, a visual element describing LQTS may be ranked highly for subjects receiving LQTS determination datum 148 indicating that they have LQTS. A numerical value may, for example, measure the degree to which a first datum is associated with a category or with a second datum. A visual element data structure may apply rules based on a comparison between a ranking or numerical value and a threshold. For example, highly ranked visual elements may be displayed more prominently. Rankings, numerical values, categories, and the like may be used to set visual element data structure rules.

Still referring to FIG. 1, in some embodiments, visual element may be interacted with. For example, visual element may include an interface, such as a button or menu. In some embodiments, visual element may be interacted with using a user device such as a smartphone, tablet, smartwatch, or computer.

Still referring to FIG. 1, in some embodiments, computing device 116 may transmit visual element data structure to user device 160. In some embodiments, visual element data structure may configure user device 160 to display visual element. In some embodiments, visual element data structure may cause an event handler to be triggered in an application of user device 160 such as a web browser. In some embodiments, triggering of an event handler may cause a change in an application of user device 160 such as display of visual element.

Still referring to FIG. 1, in some embodiments, system 100 may transmit visual element to a display. A display may communicate visual element to a user such as subject 124. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow a user such as subject 124 to input data into the display. Interactive elements may be configured to enable interaction between a user and a computing device. In some embodiments, a visual element data structure is determined as a function of data input by a user such as subject 124 into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an LQTS determination datum data structure may include a bool value representing whether or not a subject is predicted to have LQTS. In some embodiments, data in a data structure may be organized in a linked list, tree, array, matrix, tenser, and the like. In a non-limiting example, ECG datum 128 may be organized in a matrix. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date. A data structure may be stored in a database.

Still referring to FIG. 1, in some embodiments, a data structure may be read and/or manipulated by processor 104. In a non-limiting example, an ECG datum data structure may read and input into LQTS determination machine learning model 152.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Objective: To test whether an artificial intelligence (AI) deep neural network (DNN)-derived analysis of the 12-lead electrocardiogram (ECG) can distinguish patients with LQTS from those with acquired QT prolongation.

Patients and Methods: The study cohort included all patients with genetically confirmed LQTS evaluated in the Windland Smith Rice Genetic Heart Rhythm Clinic and controls from Mayo Clinic's ECG data vault comprising over 2.5 million patients. For the AI-DNN model, every patient/control with ≥1 ECG above age-and sex-specific 99th percentile values for QTc[>460 ms for all patients (male/female) <13 years of age, or >470 ms for men and >480 ms for women above this age] was included. LQTS patients were age- and sex-matched to controls at 1:5 ratio. An AI-DNN involving a multi-layer convolutional neural network (CNN) was developed to classify patients.

Results: Among the 1,599 patients with genetically confirmed LQTS, 808 had ≥1 ECG with QTc above the defined thresholds (2,987 ECGs) compared to 361,069/2.5 M controls (14% of Mayo Clinic patients getting an ECG, 'presumed negative'; 989,313 ECGs). Following age-and sex-matching and splitting, 3,309 (training), 411 (validation) and 887 (testing) ECGs were used. This model distinguished LQTS from those with acquired QT prolongation with an AUC of 0.896 (accuracy 85%, sensitivity 77%, specificity 87%, PPV 0.58, NPV 0.94). The model remained robust with AUCs close to or over 0.9, independent of matching ratio (range 1:5-1:2,000), type of ECG data used (rhythm strip or median beat), or after excluding patients with wide QRS and/or ventricular pacemaker.

Conclusion: For patients with a QTc exceeding its 99th percentile values, this novel AI-DNN functions as a LQTS mutation detector being able to identify patients with abnormal QT prolongation secondary to a LQTS-causative mutation rather than acquired QT prolongation with a >50% positive predictive value in certain models. This algorithm may facilitate screening for this potentially lethal, yet highly treatable, genetic heart disease.

As such, careful evaluation and timely recognition of QT-prolongation and its probable causes is of the utmost importance to prevent potentially life-threatening sequelae. We herein set out to test whether an AI-ECG neural network could distinguish QT-prolongation caused by congenital LQTS (i.e. stemming from the presence of a LQTS-causative mutation) from QT prolongation caused by other exogenous conditions or diagnoses ('acquired' QT prolongation). Development and implementation of such models could aid providers in early recognition, accurate diagnosis and appropriate management, including diagnosis of LQTS or addressing the underlying cause of acquired QT prolongation.

Methods

Cohort Selection

All data for the study was collected from the Mayo Clinic electronic medical record. The Mayo Clinic institutional review board approved the study. All patients with genetically confirmed LQTS, seen in the Mayo Clinic Windland Smith Rice Genetic Heart Rhythm Clinic between Jul. 1, 1999 and Oct. 1, 2021, were identified. Of these, the otherwise healthy, population-based normative 99th percentile threshold of the QTc, defined as a QTc of >480 ms for females (age≥13), >470 ms for males (age≥13), and >460 ms for prepubescent males or females (age<13), was used to find patients with LQTS who exceeded this threshold on ≥1 ECG.

A 'control' cohort of patients with acquired QT prolongation was obtained from the Mayo Clinic CVMuse ECG database of >10 million ECGs from >2.5 million patients (June 1987 to September 2021) using same 99th percentile QTc cut-off values. All patients with a QTc surpassing their age-sex-specified QT cut-off who i) passed research authorization and ii) were not evaluated for QT-prolongation in the Genetic Heart Rhythm Clinic were included in this cohort. Demographics including age at ECG, gender and BMI were extracted for training, validation and test data sets.

AI Model Development

For each patient, the 12-lead ECG, monitored at 500 Hz for 10 seconds, contains 5000 data points per lead providing an input ECG shape of 5000×12×1 (60,000 data points per ECG). To train the model, the ECGs were shuffled randomly by patient into mutually exclusive training (70%), internal validation (10%), and test (20%) data sets. We built a convolutional neural network (CNN) using the Keras Framework under Tensorflow backend (Google; Mountain View, CA, USA). The CNN was built using a total of 8 stacked blocks of 2D convolutional layers, max pooling, batch normalization and dropout layers, followed by two fully connected layers, and a final output layer activated using a Softmax function to generate 2 outputs (negative and positive, or LQTS or not). To better fit the model's shape manipulation, all ECGs were zero-padded from 5000x12×1 to 5120×12×1 to maintain an even dimension after each pooling layer. A dropout rate was used at 0.5 and 30 epochs for training the network, while saving the model weights for the epoch that achieved the highest area under the curve (AUC ROC) on the internal validation set. The model was trained on a GPU cluster with Nvidia GeForce Tesla V100 graphic card. The model was tested on the patient's first ECG as well as all of a patient's subsequent ECGs obtained at Mayo Clinic.

Besides using the 10-second, 12-lead rhythm ECG, an independent AI-ECG model using a median beat ECGs was developed for the same cohort to test the model's robustness. For the median beat ECG, each patient's input creates an ECG shape of 600×12×1 instead of 5000×12×1 and is calculated to represent a patient's median heartbeat of all 12-leads combined. A similar infrastructure (2D convolution, pooling, batch normalization and dropout rate) was used to train each model independently and compare its performance. Compared to the rhythm ECGs, zero padding was not applied on the median beat model.

Age-and Sex-Matching

For the initial models, performance showed the ideal matching ratio was a 1:5 (LQTS vs control). Its performance was monitored and evaluated using the area under the curve (AUC) of the receiver operating characteristic (ROC) curve, as well as the positive predict value (PPV), negative predict value (NPV), sensitivity, specificity, accuracy, false positive rate (FPR) and false negative rate (FNR) of the model. As a secondary analysis, the model's accuracy to distinguish LQTS from patients with acquired QT prolongation ('controls') was evaluated at higher matching ratio of 1:10 independent of the main analysis. Additionally, as a wide QRS complex or an active ventricular pacemaker are known to influence the accuracy of the measurement of the QT-interval, we further evaluated the performance of the algorithm by performing the analyses (for both 1:5 and 1:10 matching) on the same patients, but after excluding patients with a QRS>150 ms) and/or those with a pacemaker.

Prevalence-Based Matching

Next, to evaluate the model's capability to be used as a potential screening tool in clinical practice, we tested its performance at additional matching ratio, both at 1:2,000, reflecting the true prevalence of LQTS, and 1:200, matching a potential ratio of prevalence of LQTS and acquired QT prolongation in the setting of a tertiary referral center. These were done on both the entire 12-lead ECG and the derived median beat ECG, including or excluding patients with wide QRS and/or pacemaker.

Results

Cohort Characteristics

Figure 2:
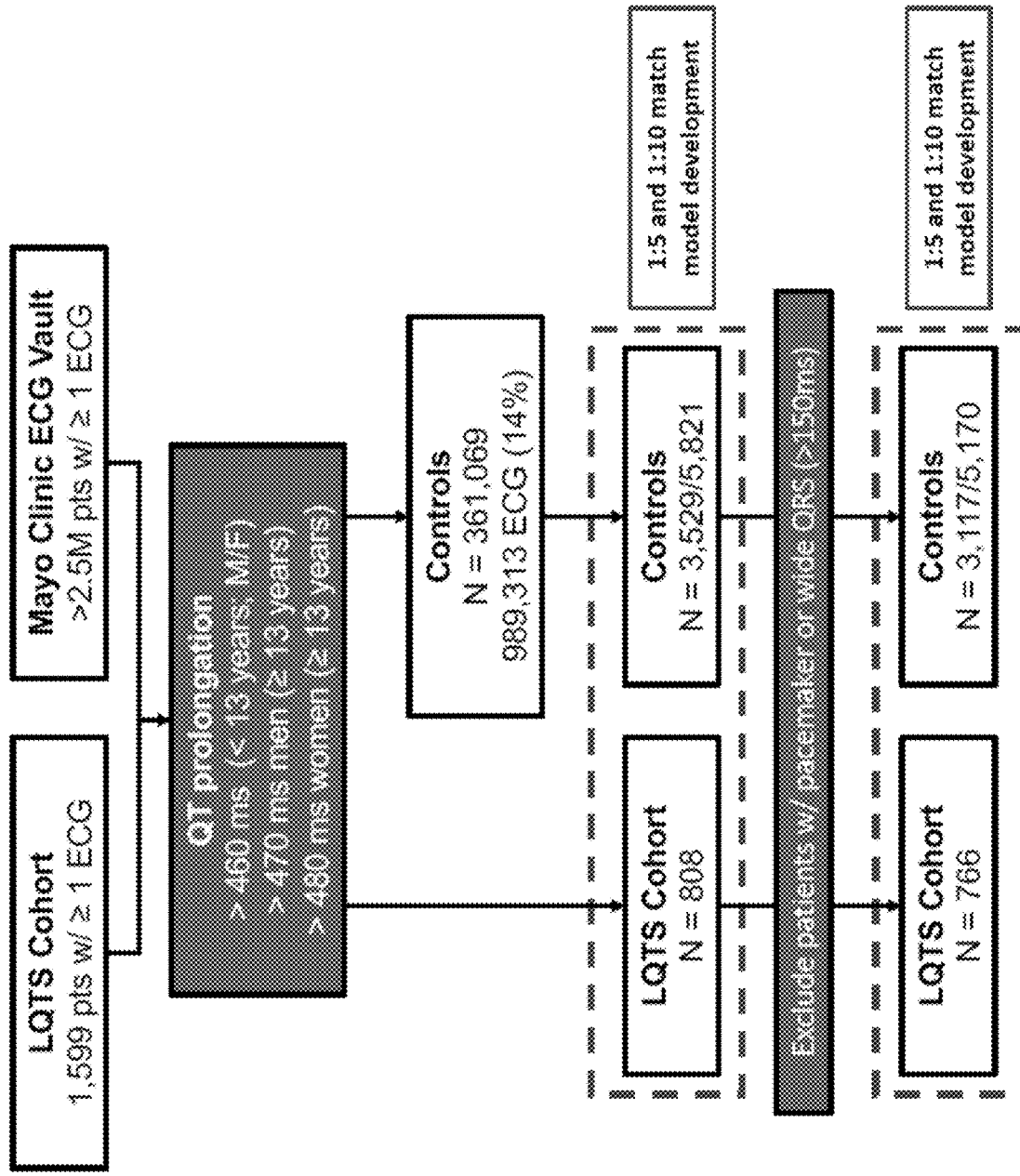
FIG. 2 is a flow chart of a study cohort.

Following IRB approval authentication of research authorization, a case cohort of patients with clinically and genetically confirmed LQTS (n=1,599) was obtained from the Windland Smith Rice Genetic Heart Rhythm Clinic database and all ECGs for these patients were abstracted from Mayo Clinic CVMuse ECG database (FIG. 2). Following filtering for the 99th percentile of QTc, 808 LQTS patients were identified as having ≥1 ECG(s) with a QTc over their age-sex defined threshold (total 2,987 ECGs). For the control cohort of patients with acquired QT prolongation, the Mayo Clinic ECG data vault containing over 10 million ECGs for more than 2.5 million patients was queried using the same 99th percentile thresholds, identifying 361,069 patients (14%) with at least 1 ECG over that specified QTc threshold for a total of 989,313 ECGs (FIG. 2). These cohorts were used subsequently to train, validate, and test the AI-DNN models at the following case control ratios: 1) statistically powered (1:5 and 1:10), 2) LQTS disease prevalence/population-based screening (1:2,000) and 3) clinical screening (ratio of LQTS vs. QT prolongation at referral clinic; 1:2,00).

Model Development at 1:5 and 1:10 Matching Ratios

After 99th percentile filtering and 1:5 and 1:10, age-sex matching, 3,529 and 5,821 controls with acquired QT prolongation were used, respectively (FIG. 2). FIG. 3 provides a table showing the basic demographics (sex, age at ECG, BMI) of both cohorts at the 1:5 matching ratio for the training, testing and validation set demonstrating these cohorts were alike across all parameters. FIG. 3 describes baseline characteristics of the case (LQTS) and control (acquired QT prolongation) population (1:5 match ratio).

Figure 4A:
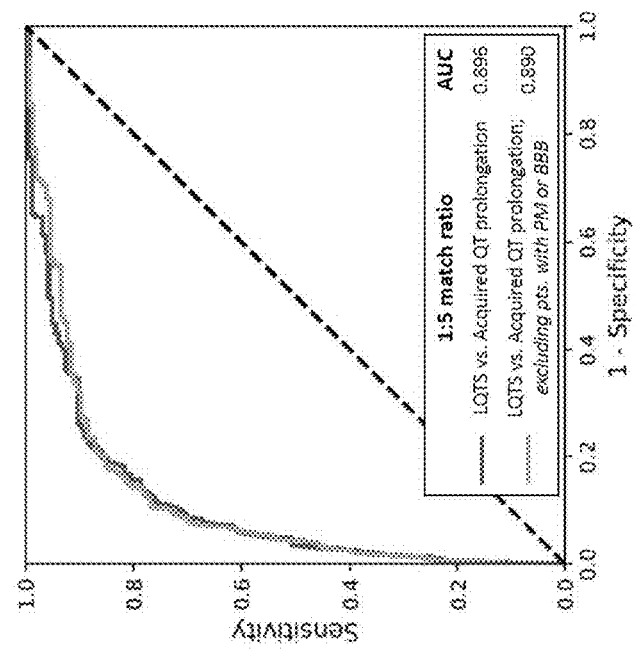
FIG. 4A is a graph of a receiver operating characteristic curve of first ECG with/without pacemaker/QRS filter at a 1:5 match ratio.
Figure 4B:
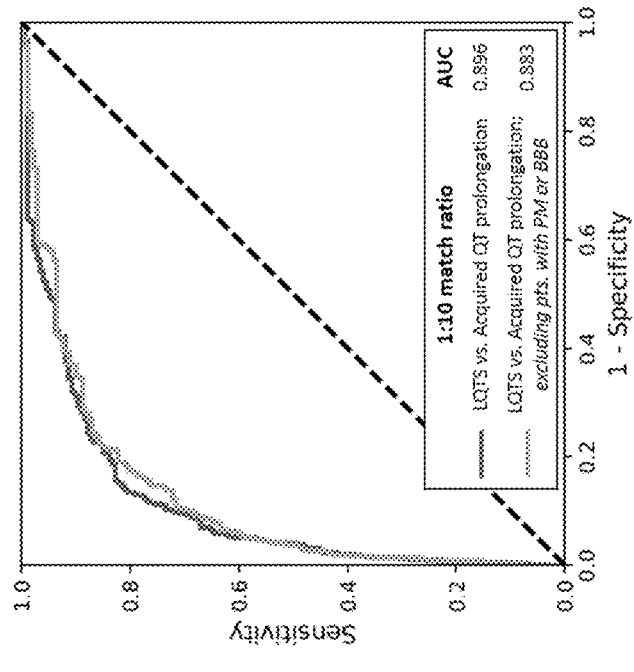
FIG. 4B is a graph of a receiver operating characteristic curve of first ECG with/without pacemaker/QRS filter at a 1:10 match ratio.

Following model development, as shown in FIG. 4A, the AI-ECG showed excellent ability to distinguish patients with LQTS from those with acquired QT prolongation at an AUC of 0.896 (accuracy 85%, sensitivity 77%, specificity 87%, PPV 58%, NPV 94%; FIG. 5). Similarly, when running the model at a 1:10 match ratio, it was equally successful in distinguishing the 2 groups (AUC 0.896, accuracy 86%, sensitivity 79%, specificity 87%, PPV 47%, NPV 97%; FIG. 4B and FIG. 5), although a slight drop in PPV was observed. FIG. 5 describes main and sub-group analyses examining the performance of the AI-ECG-LQTS detect algorithm.

After filtering out patients with a wide QRS complex and/or active ventricular pacemaker known to influence accurate QT assessment, performance of the AI-ECG algorithm was still excellent with AUCs of 0.89 and 0.883 at 1:5 and 1:10 matching ratios, respectively (FIG. 4A and 4B). Additional performance details of the model at all matching ratios can be found in FIG. 5.

Internal Model Validation

To validate the model's robustness, two separate approaches and separate AI-ECG algorithms were used using the same dataset. First, rather than using the rhythm ECG, median beat ECGs were created as described above. Akin to the rhythm ECGs, the median beat model was able to successfully distinguish LQTS patients from those with acquired QT prolongation at both matching ratios of 1:5 and 1:10 (AUC 0.9 and 0.912 respectively) and after exclusion of wide QRS/pacemaker patients (AUC 0.912 and 0.908 respectively). Additional performance details of the model for median beat ECGs can be found in FIG. 5.

Furthermore, both models (rhythm ECG and median beat ECG) were tested using all of a patient's ECGs rather than just their first ECG with QT prolongation, and again the algorithms showed robust performance characteristics at both matching ratios (1:5 and 1:10) for both the rhythm ECG and median beat ECG, with or without patients with wide QRS and/or pacemakers with AUCs ranging from 0.906 to 0.945 with all performance characteristics shown in FIG. 6. FIG. 6 describes validation of the AI-ECG-LQTS detect models on all ECGs of the cases. FIG. 7 provides a table describing baseline characteristics of patients with LQTS and control populations (matching ratio=2000).

Prevalence and Screening Model Scenarios

Figure 8:
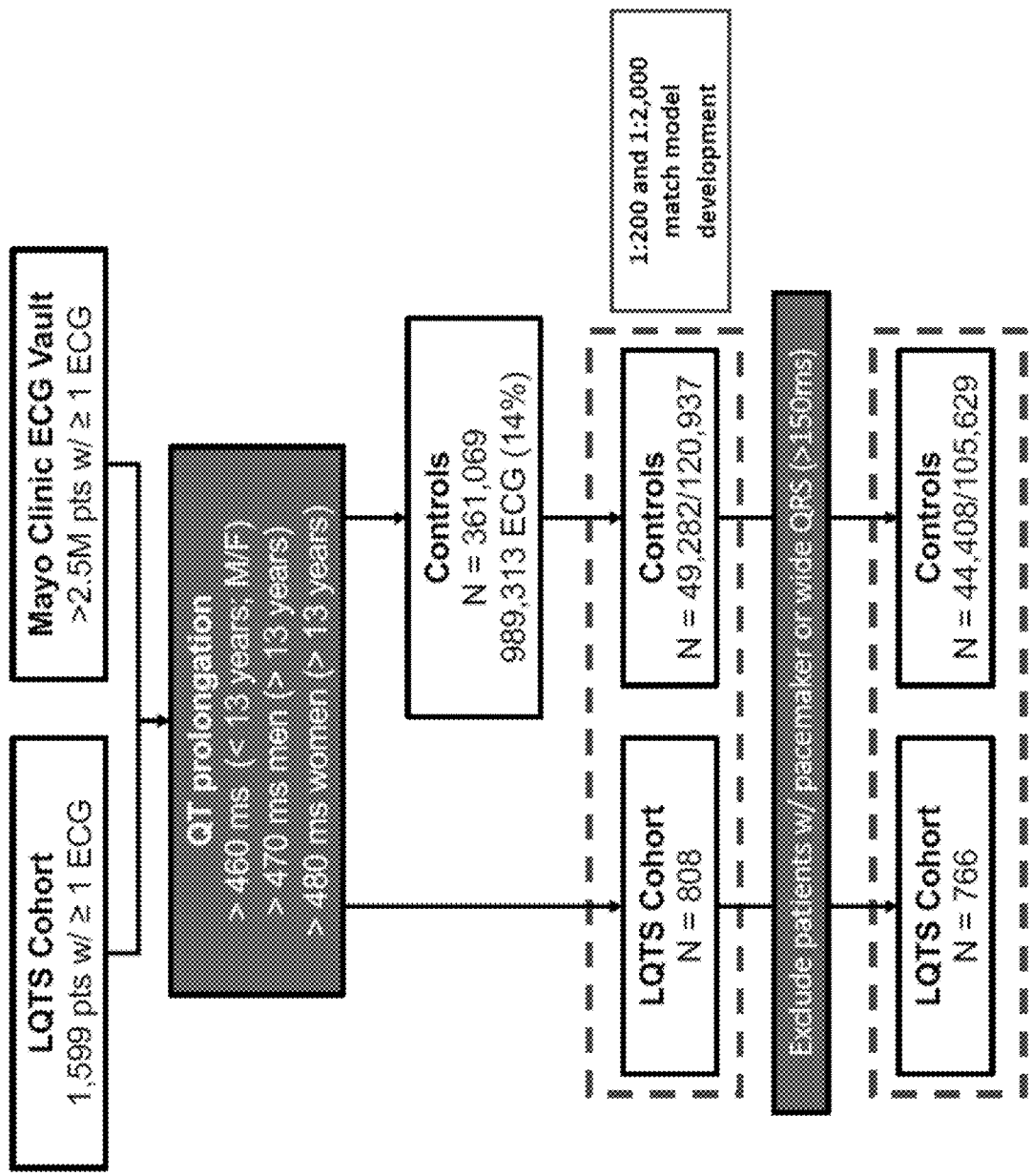
FIG. 8 is a flow chart of a study cohort.

While this AI-ECG QT-prolongation algorithm performed well at ideal statistical matching ratios (1:5 and 1:10), these do not reflect the real-life situation of LQTS disease prevalence (~1 in 2,000 individuals in the general population) or the ratio at which LQTS patients would be seen in a tertiary medical center compared to patients with acquired QT prolongation. With acquired QT prolongation seen in ~10% of patients seen in a tertiary referral clinic, a screening ratio of 1:200 would therefore reflect a LQTS vs. acquired QT prolongation prevalence. Using the same LQTS cohort and control database, 49,282 and 120,937 patients with acquired QT prolongation were used for 1:200 and 1:2,000 match development (FIG. 8). Starting with LQTS disease prevalence (1:2,000 match ratio), the AI-ECG model was able to successfully distinguish LQTS from acquired QT prolongation with high AUC (0.933), accuracy (89%), sensitivity (81%) and specificity (90%), although a significant drop in PPV was observed (5%). Similarly, high performance values were observed after excluding patients with wide QRS and/or pacemaker (AUC 0.948), for median beat (AUC 0.952 and 0.951) and all ECG analyses (AUC ranging 0.930 to 0.952). All performance characteristics are summarized in FIGS. 3 and 5.

Lastly, to mimic a QT prolongation screening situation for patients seen at a tertiary referral center, we developed and tested an AI-ECG using a 1:200 matching ratio. Herein, the AI-ECG had an excellent discriminating AUC of 0.921 in separating patients with LQTS from those with acquired QT prolongation (accuracy 88%, sensitivity 78%, specificity 88%), but again a much lower PPV of 10% was observed (NPV 99.6%). These performance metrics tracked for all models, filters and when including all ECGs for the 1:200 ratio (FIGS. 3 and 5).

Discussion

Because of its risk of developing into potentially lethal ventricular arrythmias, early and accurate identification of not only a prolonged QTc on a patient's ECG but also the underlying cause for that QT prolongation is of the utmost importance. While the standard 12-lead is an easy and affordable screening tool to potentially find individuals with a prolonged QTc, accurate QT measurement and more importantly, identifying the cause of the QT prolongation, remains challenging.

In clinical practice, QT prolongation is not solely associated with LQTS (prevalence 1 in 2,000 individuals) but often seen in patients with QT prolonging electrolyte disturbances, particularly hypokalemia and hypomagnesemia, various cardiac and non-cardiac conditions that may be QT prolonging, or medications that prolong the QT interval either as an intended part of the drug's mechanism of action (i.e. dofetilide) or as an unwanted side effect of that non-cardiac medication (www.crediblemeds.org). More importantly, QT prolongation not associated with genetically-mediated LQTS is i) far more common (>10% of patients evaluated at a tertiary referral clinic and ii) its causes can often be addressed and corrected. This poses a great dilemma in clinical practice and opens the door to test the possibilities of the AI-ECG.

In this study, derived from one of the largest cohorts of LQTS patients evaluated at a single LQTS specialty clinic merged with our institution's a vast historical ECG database and our Department of Cardiovascular Medicine's growing experience in the development of AI-ECG algorithms, we developed a novel AI-ECG algorithm that can successfully distinguish QT prolongation caused by a LQTS-causative mutation from that caused by other, underlying conditions with AUC's>0.9, independent of matching ratio, presence/absence of a ventricular pacemaker or bundle branch block, or type of ECG data used (rhythm strip vs. median beat).

More importantly, although we observed an anticipated drop in PPV, the accuracy, sensitivity and specificity remained high after we created a model to represent a screening situation, which would be critical for use of the model in the clinical setting. For this model, we simulated two possible screening scenarios representing case-matching at either the prevalence of LQTS in the general population (1:2,000 matching ratio) or matching at a ratio of LQTS vs. the incidence of QT prolongation in clinical practice (1:200). By applying these matching ratios, this algorithm could potentially be used in clinical practice, aiding providers in identification of QT prolongation whereby this tool—in pointing towards LQTS—could serve as de facto LQTS mutation detector.

Importantly, while external validation of this AI-derived tool on independent cohorts from different centers and or populations would further support its efficacy, the fact that the model's performance metrics remained similar using various approaches (i.e. different matching ratios, single vs. multiple ECGs or using a median beat analysis strategy) shows the internal robustness of the developed model allowing for possible implementation in ECG labs, the electronic medical record, and possibly mobile (monitoring) technology. Herein, and combined with our previously developed algorithms, one can imagine multiple applications ranging from a simple comment added to the ECG report to an automated alert sent to provider to warn them of the presence of QT prolongation along with an accurate AI-derived QTc value and an indication of the underlying cause (LQTS vs acquired QT prolongation).

Conclusions

For patients with a QTc exceeding its 99th percentile values, this novel AI-DNN functions as a LQTS mutation detector being able to identify patients with abnormal QT prolongation secondary to a LQTS-causative mutation rather than acquired QT prolongation with up to a 50% positive predictive value. This algorithm may facilitate screening for this potentially lethal, yet highly treatable, genetic heart disease and guide proper management of the underlying condition.

Figure Legends

FIG. 2: Flow chart of the study cohort. Flow chart of study cohort for the 1:5 and 1:10 matching models of the QT-prolongation algorithm. Following queries of the Windland Smith Rice Genetic Heart Rhythm Clinic database (left) and Mayo Clinic ECG Data Vault, patients with >1 ECG with a QTc over the 99th percentile were identified and matched at a 1:5 or 1:10 ratio of LQTS versus patients with 'acquired QT prolongation'. Subsequently, cohorts were created excluding patients with a pacemaker and/or wide QRS complex (QRS>150 ms)

FIG. 4A and FIG. 4B: ROC curve of first ECG with/without pacemaker/QRS filter (1:5 and 1:10 match ratio). Receiver-operator characteristics curve of the QT-algorithm showing excellent performance to distinguish LQTS from acquired QT-prolongation with or without patients with a pacemaker and/or wide QRS complex (BBB, bundle branch block, QRS>150 ms) at a 1:5 (FIG. 4A) or 1:10 (FIG. 4B) ratio.

FIG. 8. Flow chart of the study cohort (1:200 and 1,2000 match ratio). Flow chart of study cohort for the 1:200 and 1:2,000 matching models of the QT-prolongation algorithm. To examine the model's performance at 'screening' or 'LQTS prevalence' levels, matching LQTS versus patients with acquired QT prolongation. Akin to the previous analyses, cohorts with and without a pacemaker and/or wide QRS complex were created.

Figure 9:
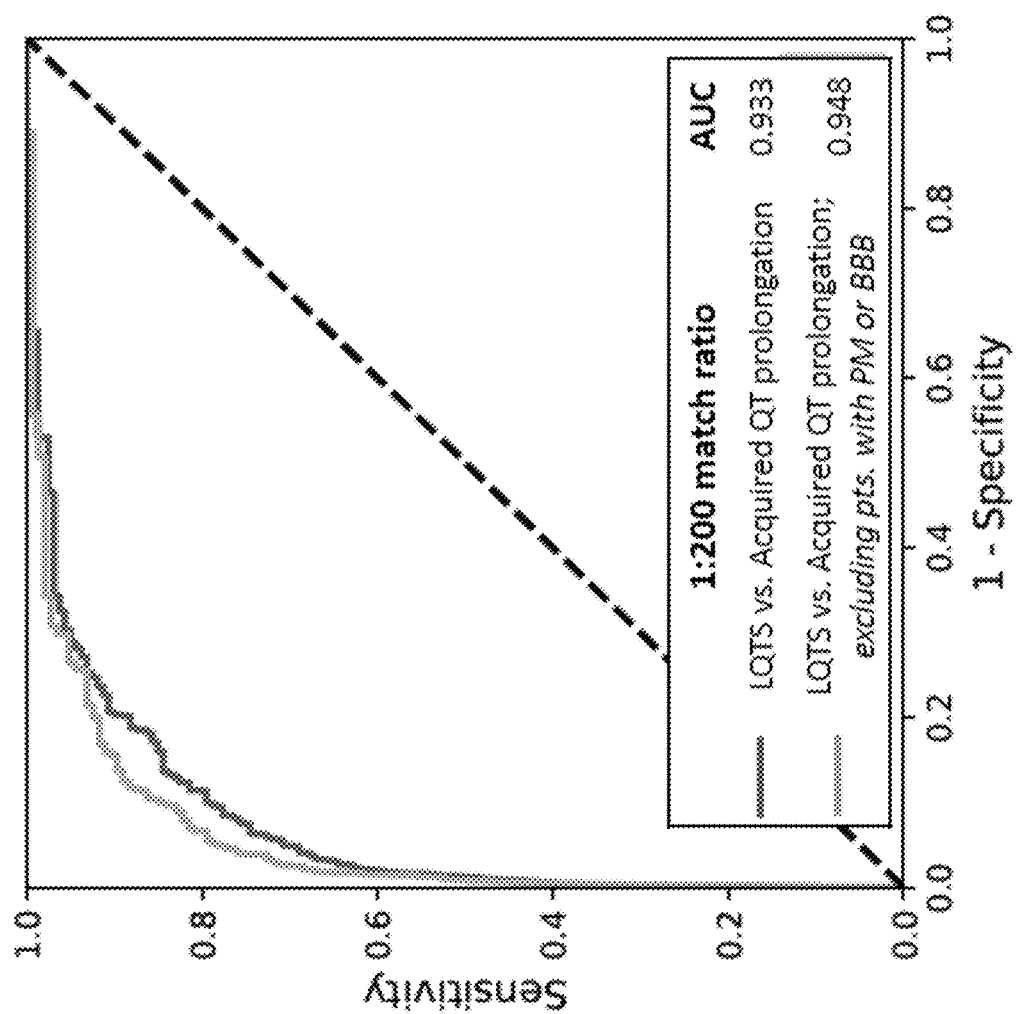
FIG. 9 is a graph of a receiver operating characteristic curve of first ECG with/without pacemaker/QRS filter at a 1:2000 match ratio.

FIG. 9: ROC of first ECG with/without pacemaker/QRS filter (1:2,000 match ratio). Receiver-operator characteristics curve of the QT-algorithm using a matching ratio equivalent to the LQTS disease prevalence in population (1:2,000) showing the model's performance to distinguish LQTS from acquired QT-prolongation with or without patients with a pacemaker and/or wide QRS complex (BBB, bundle branch block, QRS>150 ms).

Figure 10:
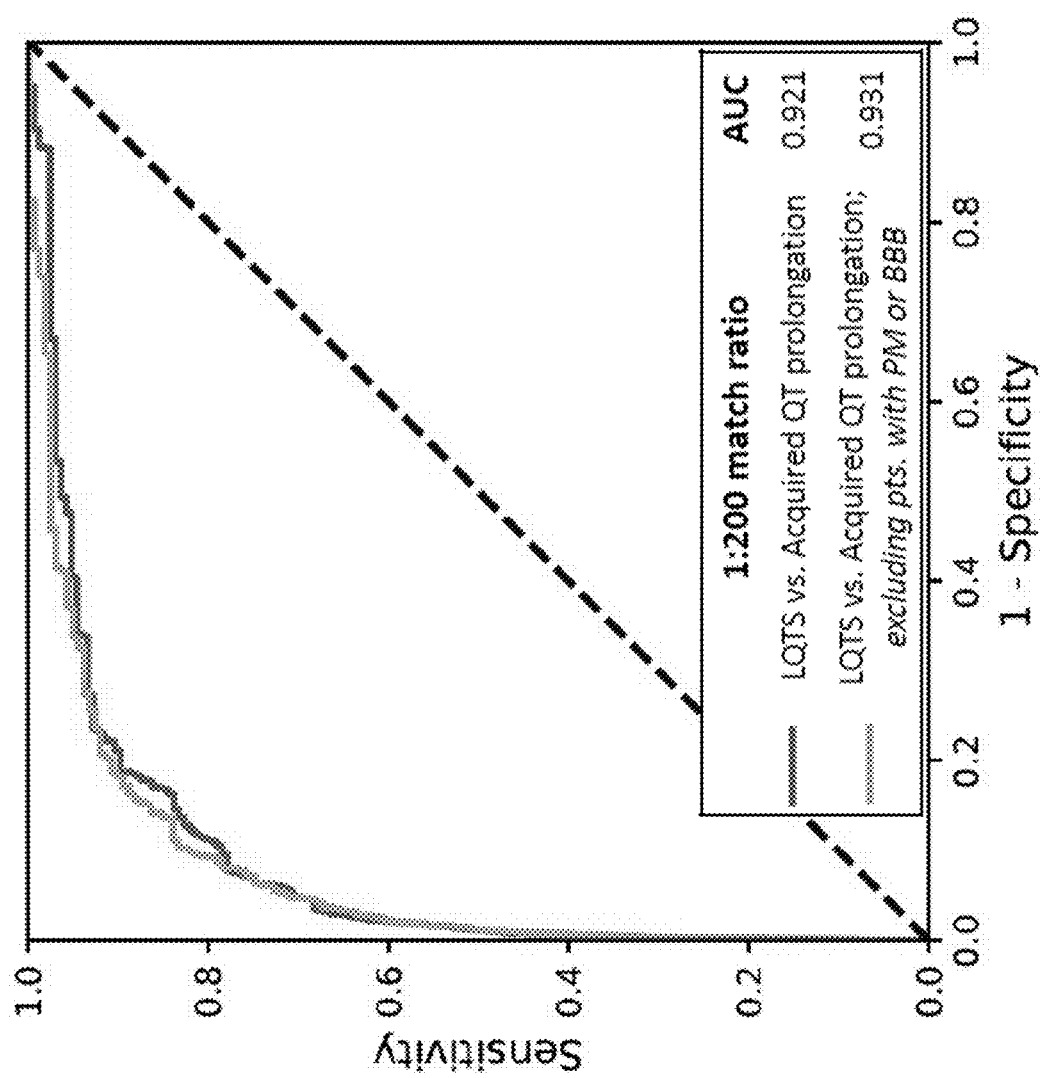
FIG. 10 is a graph of a receiver operating characteristic curve of first ECG with/without pacemaker/QRS filter at a 1:200 match ratio.

FIG. 10: ROC of first ECG with/without pacemaker/QRS filter (1:200 match ratio). Receiver-operator characteristics curve of the QT-algorithm using matching ratio equivalent to the LQTS disease prevalence versus the incidence of QT prolongation seen in a tertiary referral clinic (10%) resulting in a 1:200 match ratio. At this ratio, the model showed excellent performance to distinguish LQTS from acquired QT-prolongation, with or without patients with a pacemaker and/or wide QRS complex (BBB, bundle branch block, QRS>150 ms).

Figure 11:
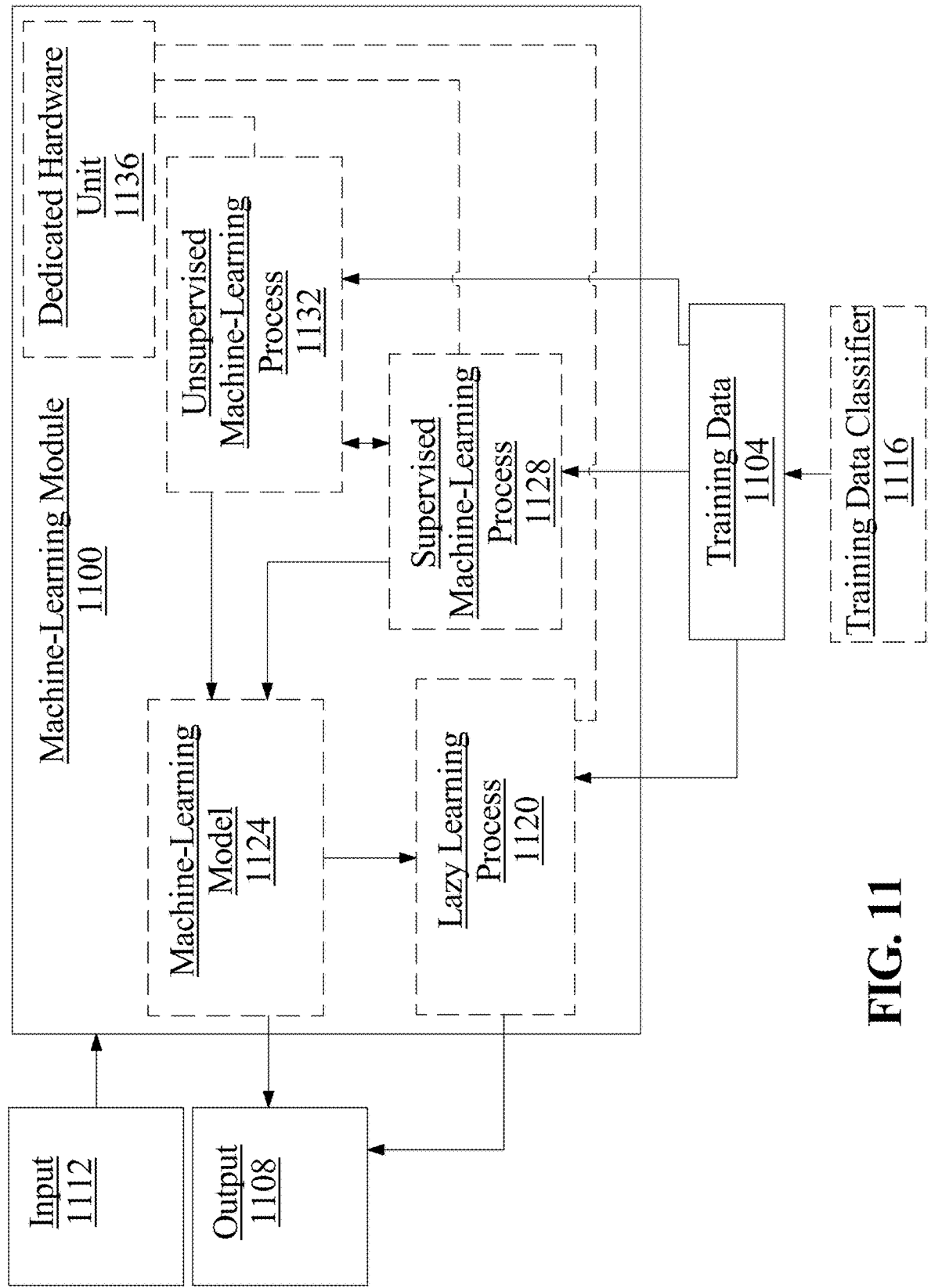
FIG. 11 is a box diagram of an exemplary machine learning model.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm instantiated in hardware or software logic, data structures, and/or functions that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example, inputs may include ECG datum 128 and outputs may include LQTS determination datum 148.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1100 may generate a classifier using a classification algorithm, defined as a processes whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1116 may classify elements of training data according to subject demographics.

With further reference to FIG. 11, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 11, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 11, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 11, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 11, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, a processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 11, machine-learning processes as described in this disclosure may be used to generate machine-learning models 1124. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include ECG data as described above as inputs, LQTS data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

With further reference to FIG. 11, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 11, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1132 may not require a response variable; unsupervised processes 1132 may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 11, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 11, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 11, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 11, one or more processes or algorithms described above may be performed by at least a dedicated hardware unit 1136. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1136 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1136 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1136 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 12:
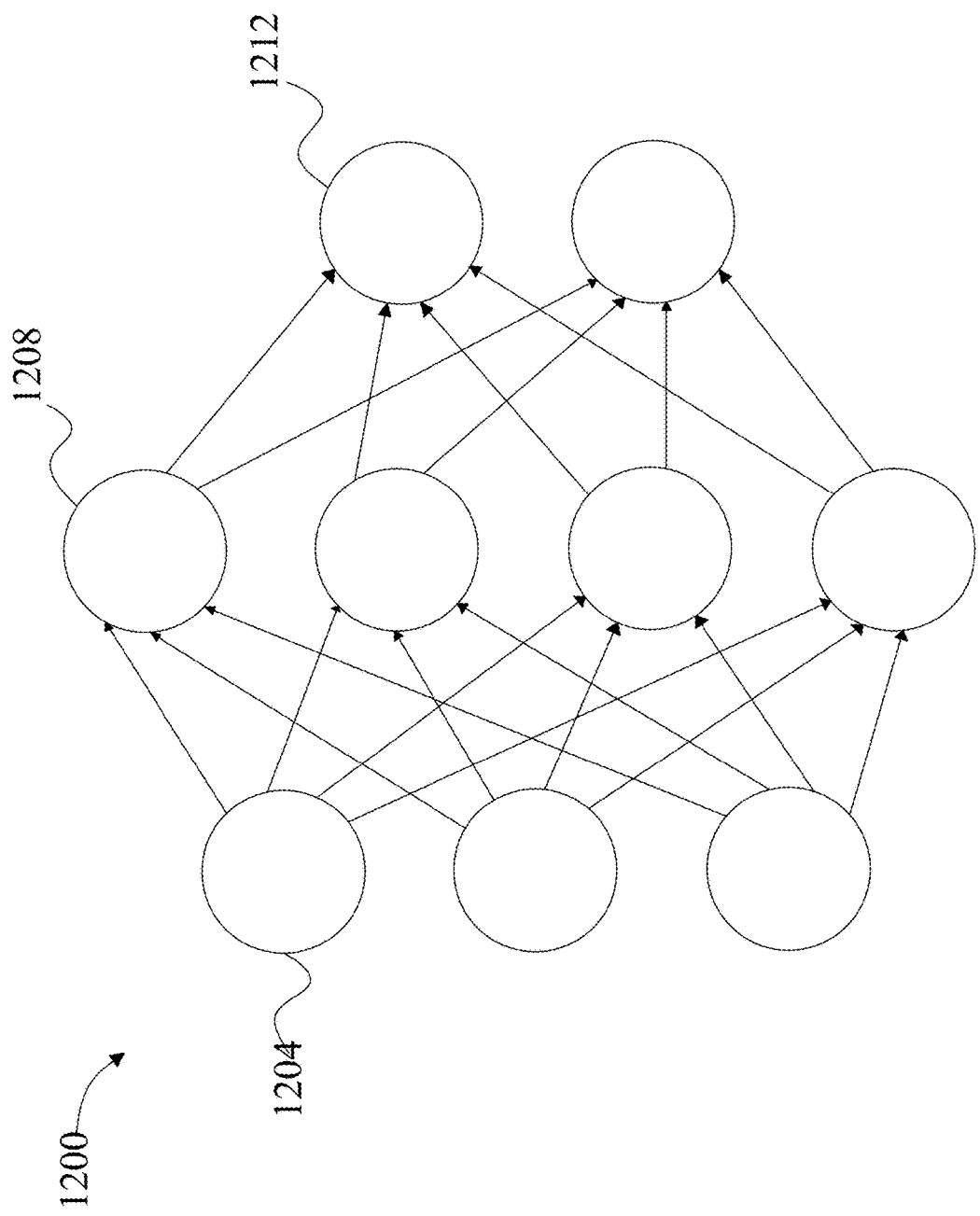
FIG. 12 is a diagram of an exemplary neural network.

Referring now to FIG. 12, an exemplary embodiment of neural network 1200 is illustrated. A neural network 1200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1204, one or more intermediate layers 1208, and an output layer of nodes 1212. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 13:
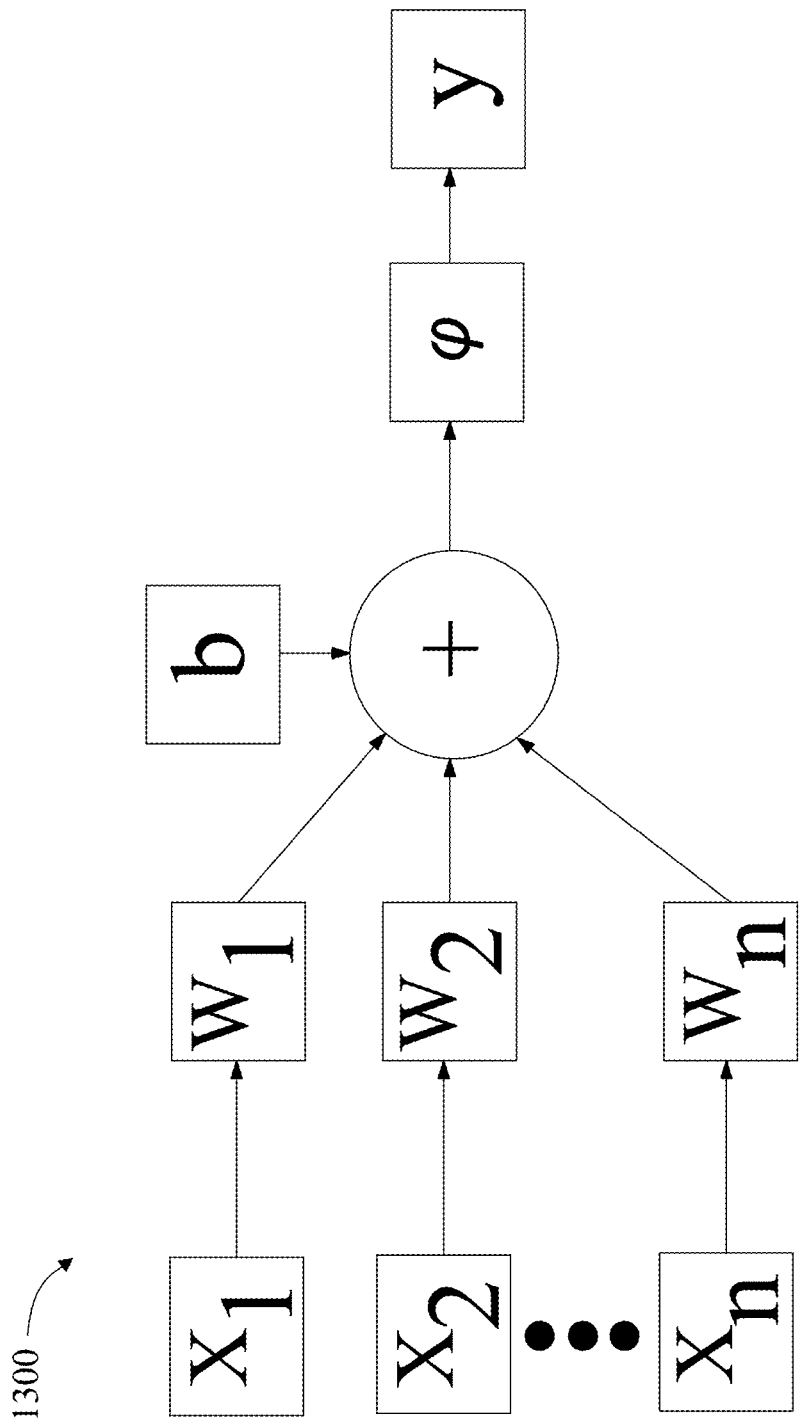
FIG. 13 is a diagram of an exemplary neural network node.

Referring now to FIG. 13, an exemplary embodiment of a node 1300 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 13, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 13, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 14:
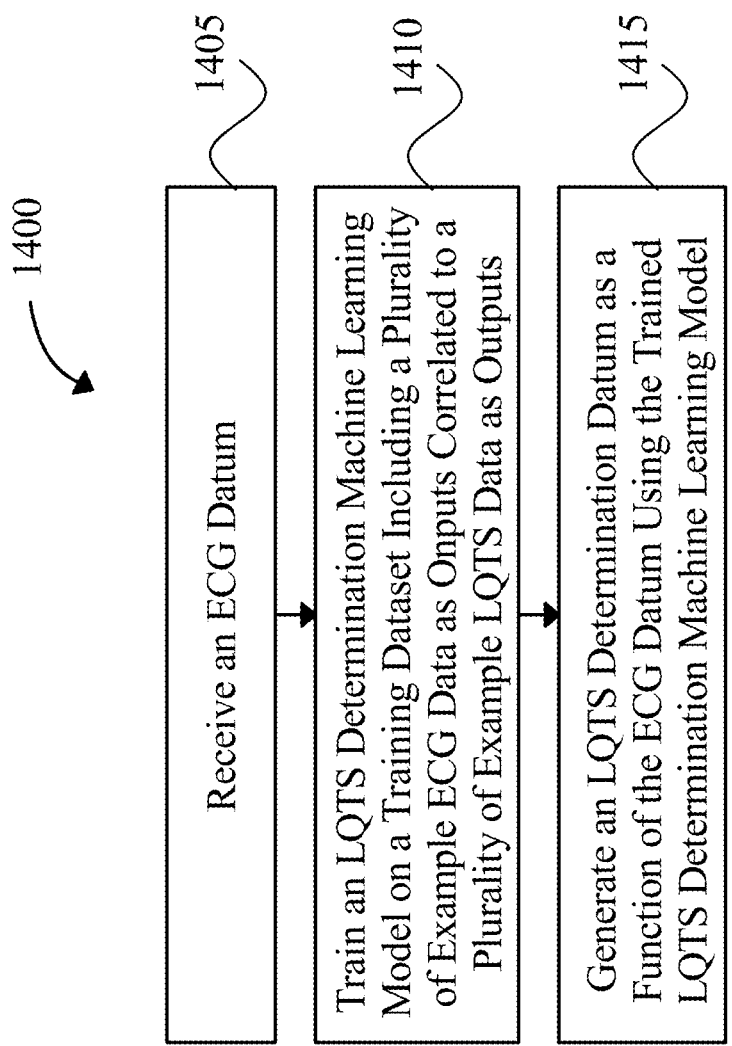
FIG. 14 is a diagram depicting an exemplary method of identifying LQTS in a subject.

Referring now to FIG. 14, an exemplary embodiment of a method 1400 of identifying LQTS in a subject is illustrated. One or more steps if method 1400 may be implemented, without limitation, as described with reference to other figures. One or more steps of method 1400 may be implemented, without limitation, using at least a processor.

Still referring to FIG. 14, in some embodiments, method 1400 may include receiving an electrocardiogram (ECG) datum 1405. In some embodiments, ECG datum comprises a rhythm strip ECG datum. In some embodiments, the ECG datum comprises a median beat ECG datum. In some embodiments, the ECG datum comprises data collected using 12 ECG leads. In some embodiments, the ECG datum is associated with a subject; and the subject has a ventricular pacemaker.

Still referring to FIG. 14, in some embodiments, method 1400 may include training an LQTS determination machine learning model on a training dataset including a plurality of example ECG data as inputs correlated to a plurality of example LQTS data as outputs 1410. In some embodiments, the LQTS determination machine learning model comprises a neural network. In some embodiments, the LQTS determination machine learning model comprises a convolutional neural network. In some embodiments, the example LQTS data comprises a 1:5 ratio of LQTS outputs to non-LQTS outputs. In some embodiments, the example LQTS data comprises a 1:200 ratio of LQTS outputs to non-LQTS outputs.

Still referring to FIG. 14, in some embodiments, method 1400 may include generating the LQTS determination datum as a function of the ECG datum using the trained LQTS determination machine learning model 1415.

Still referring to FIG. 14, in some embodiments, the ECG datum is associated with a subject; and the method further comprises identifying LQTS in the subject as a function of the LQTS determination datum. In some embodiments, the ECG datum is associated with a subject; and the method further comprises administering a therapy to the subject as a function of the LQTS determination datum.

Still referring to FIG. 14, in some embodiments, the LQTS determination machine learning model comprises a neural network with a plurality of 2D convolution stacked blocks and a final output layer activated using a function which assigns probabilities to each class of a plurality of classes. In some embodiments, method 1400 may further include further comprising zero-padding the ECG datum. In some embodiments, method 1400 may further include modifying data of the ECG datum recorded using a first set of leads to simulate data of a second set of leads. In some embodiments, the ECG datum is received from an electronic health record database.

A system, apparatus, method, or feature thereof may be consistent with any system, apparatus, method, or feature thereof disclosed in U.S. patent application Ser. No. 18/592,680, filed on Mar. 1, 2024, and titled "APPARATUS AND METHOD FOR TRAINING AN ARTIFICIAL INTELLIGENCE-SUPPORTED DIAGNOSTIC ASSESSMENT TOOL," the entirety of each of which is hereby incorporated by reference. For example, system 100 may modify data of ECG datum 128 recorded using a first set of leads to simulate data of a second set of leads.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
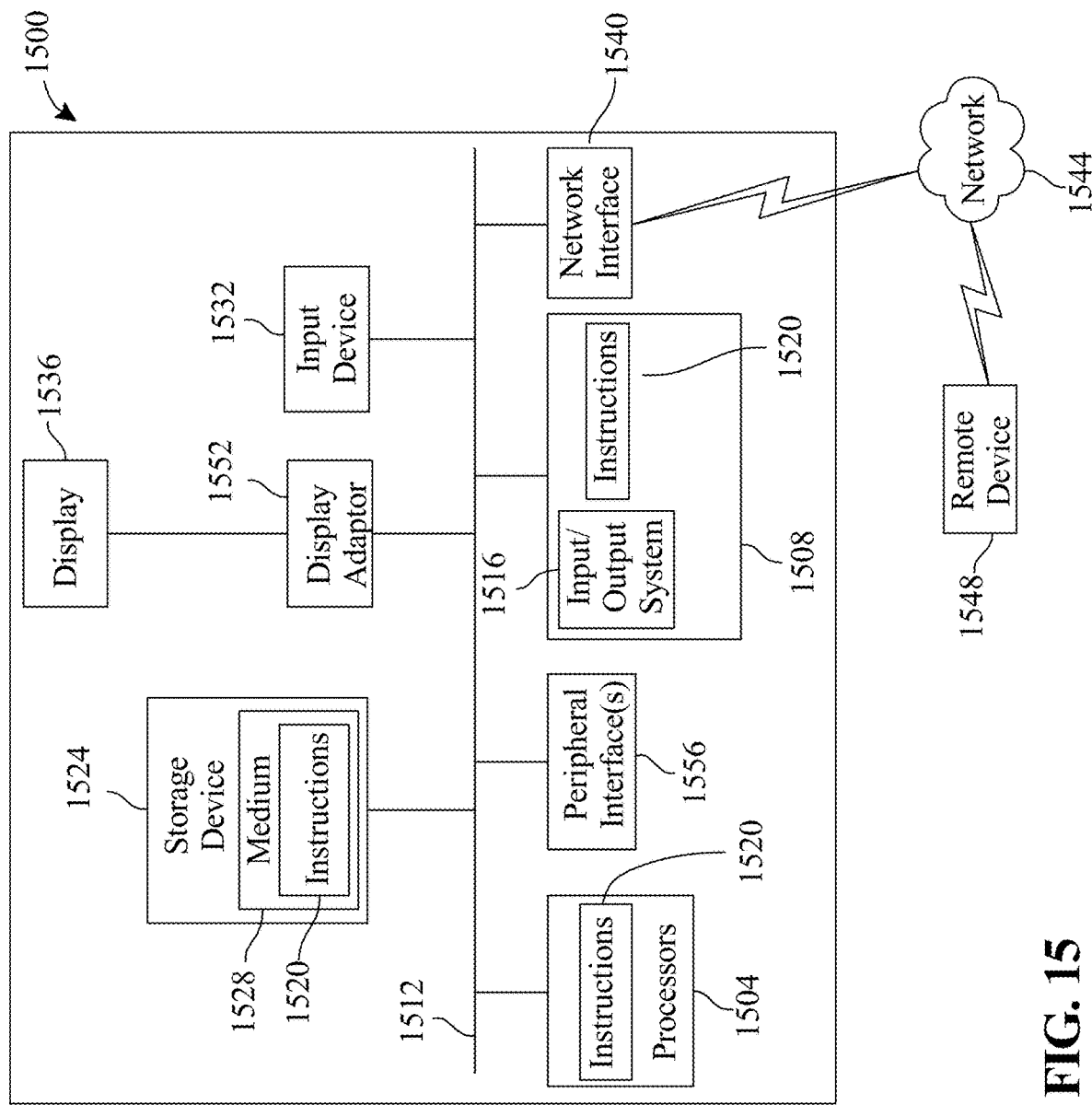
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a long QT syndrome (LQTS) determination datum, the apparatus comprising:
    an electrocardiogram (ECG) sensor configured to detect an ECG datum;
    at least a processor; and
    a memory communicatively connected to the at least a processor, wherein the memory contains instructions configuring the at least a processor to:
    receive the ECG datum from the ECG sensor;
    train an LQTS determination machine learning model on a training dataset including a plurality of example ECG data as inputs correlated to a plurality of example LQTS data as outputs, wherein training the LQTS determination machine learning model comprises:
        receiving a plurality of electronic health records associated with a plurality of patients, wherein at least a first portion of the plurality of electronic health records comprises information associated with one or more patients having genetically confirmed LQTS and at least a second portion of the plurality of electronic health records comprises information associated with more than one patient having acquired QT prolongation;
        dividing the plurality of electronic health records into a training set, an internal validation set and a test set; and
        training the LQTS determination machine learning model to distinguish between the genetically confirmed LQTS and the acquired QT prolongation as a function of the training set, the internal validation set and the test set;
    identify a set of patients of the plurality of patients having a bundle branch block (BBB) and a wide QRS complex with a QRS greater than 150 milliseconds;
    filter the training set by removing electronic health records of patients in the identified set of patients from the training set to create a filtered training set;
    validate robustness of the LOTS determination machine learning model by comparing relative accuracies of results generated by the LOTS determination machine learning model trained on the training set inclusive of the electronic health records of patients in the identified set of patients and an LOTS machine learning model trained on the filtered training set, wherein validating robustness of the LOTS determination machine learning model includes evaluating area under a curve (AUC) of a receiver operating characteristic (ROC) curve; and
    generate an LQTS determination datum as a function of the ECG datum using the trained LQTS determination machine learning model;
    wherein the LQTS determination machine learning model comprises a neural network with a plurality of 2D convolution stacked blocks and a final output layer activated using at least an activation function.

2. The apparatus of claim 1, wherein the memory contains instructions configuring the at least a processor to zero-pad the ECG datum.

3. The apparatus of claim 1, wherein receiving the ECG datum comprises modifying data of the ECG datum recorded using a first set of leads to simulate data of a second set of leads.

4. The apparatus of claim 1, wherein the ECG datum comprises a rhythm strip ECG datum.

5. The apparatus of claim 1, wherein the ECG datum comprises a median beat ECG datum.

6. The apparatus of claim 1, wherein the ECG datum comprises data collected using 12 ECG leads.

7. The apparatus of claim 1, wherein the memory contains instructions configuring the at least a processor to receive the ECG datum from an electronic health record database.

8. The apparatus of claim 1, wherein the example LQTS data comprises a 1:5 ratio of LQTS outputs to non-LQTS outputs.

9. The apparatus of claim 1, wherein the example LQTS data comprises a 1:200 ratio of LQTS outputs to non-LQTS outputs.

10. A method of generating a long QT syndrome (LQTS) determination datum, the method comprising:
    using at least a processor, receiving an electrocardiogram (ECG) datum from an ECG sensor configured to detect the ECG datum;
    using the at least a processor, training an LQTS determination machine learning model on a training dataset including a plurality of example ECG data as inputs correlated to a plurality of example LQTS data as outputs, wherein training the LQTS determination machine learning model comprises:

receiving a plurality of electronic health records associated with a plurality of patients, wherein at least a first portion of the plurality of electronic health records comprises information associated with one or more patients having genetically confirmed LQTS and at least a second portion of the plurality of electronic health records comprises information associated with more than one patients having acquired QT prolongation;

dividing the plurality of electronic health records into a training set, an internal validation set and a test set; and training the LOTS determination machine learning model to distinguish between the genetically confirmed LQTS and the acquired QT prolongation as a function of the training set, the internal validation set and the test set;

using the at least a processor, identifying a set of patients of the plurality of patients having a bundle branch block (BBB) and a wide QRS complex with a QRS greater than 150 milliseconds;

using the at least a processor, filtering the training set by removing electronic health records of patients in the identified set of patients from the training set to create a filtered training set;

using the at least a processor, validating robustness of the LOTS determination machine learning model by comparing relative accuracies of results generated by the LOTS determination machine learning model trained on the training set inclusive of the electronic health records of patients in the identified set of patients and an LOTS machine learning model trained on the filtered training set, wherein validating robustness of the LOTS determination machine learning model includes evaluating area under a curve (AUC) of a receiver operating characteristic (ROC) curve; and using the at least a processor, generating an LQTS determination datum as a function of the ECG datum using the trained LQTS determination machine learning model;

wherein the LOTS determination machine learning model comprises a neural network with a plurality of 2D convolution stacked blocks and a final output layer activated using at least an activation function.

11. The method of claim 10, further comprising zero-padding the ECG datum.

12. The method of claim 10, wherein receiving the ECG datum comprises modifying data of the ECG datum recorded using a first set of leads to simulate data of a second set of leads.

13. The method of claim 10, wherein the ECG datum comprises a rhythm strip ECG datum.

14. The method of claim 10, wherein the ECG datum comprises a median beat ECG datum.

15. The method of claim 10, wherein the ECG datum comprises data collected using 12 ECG leads.

16. The method of claim 10, wherein the ECG datum is received from an electronic health record database.

17. The method of claim 10, wherein the example LQTS data comprises a 1:5 ratio of LQTS outputs to non-LQTS outputs.

18. The method of claim 10, wherein the example LQTS data comprises a 1:200 ratio of LQTS outputs to non-LQTS outputs.

19. The method of claim 10, wherein the ECG datum is associated with a subject;

wherein the method further comprises administering a therapy to the subject as a function of the LQTS determination datum.

20. A system for generating a long QT syndrome (LQTS) determination datum, the system comprising:

an electrocardiogram (ECG) sensor configured to detect an ECG datum;

a computing device communicatively connected to the ECG sensor configured to:

receive an electrocardiogram (ECG) datum from the ECG sensor;

generate an LOTS determination datum as a function of the ECG datum using a trained LQTS determination machine learning model, wherein training the LOTS determination machine learning model comprises:

receiving a plurality of electronic health records associated with a plurality of patients, wherein at least a first portion of the plurality of electronic health records comprises information associated with one or more patients having genetically confirmed LQTS and at least a second portion of the plurality of electronic health records comprises information associated with more than one patients having acquired QT prolongation;

dividing the plurality of electronic health records into a training set, an internal validation set and a test set; and training the LQTS determination machine learning model to distinguish between the genetically confirmed LQTS and the acquired QT prolongation as a function of the training set, the internal validation set and the test set;

identify a set of patients of the plurality of patients having a bundle branch block (BBB) and a wide QRS complex with a QRS greater than 150 milliseconds;

filter the training set by removing electronic health records of patients in the identified set of patients from the training set to create a filtered training set;

validate robustness of the LOTS determination machine learning model by comparing relative accuracies of results generated by the LOTS determination machine learning model trained on the training set inclusive of the electronic health records of patients in the identified set of patients and an LOTS machine learning model trained on the filtered training set, wherein validating robustness of the LOTS determination machine learning model includes evaluating area under a curve (AUC) of a receiver operating characteristic (ROC) curve; and transmit for displaying the LQTS determination datum;

wherein the LQTS determination machine learning model comprises a neural network with a plurality of 2D convolution stacked blocks and a final output layer activated using at least an activation function; and a display configured to:

receive the LOTS determination datum from the computing device; and display the LQTS determination datum.

* * * * *